(12) United States Patent
Park et al.

(10) Patent No.: US 8,573,899 B2
(45) Date of Patent: Nov. 5, 2013

(54) CLAMPING APPARATUS FOR A CUTTING INSERT

(75) Inventors: Hong Sik Park, Daegu (KR); Sung Hyup Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 269 days.

(21) Appl. No.: 13/143,872

(22) PCT Filed: Dec. 31, 2009

(86) PCT No.: PCT/KR2009/008016
§ 371 (c)(1),
(2), (4) Date: Jul. 8, 2011

(87) PCT Pub. No.: WO2010/082736
PCT Pub. Date: Jul. 22, 2010

(65) Prior Publication Data
US 2011/0274507 A1 Nov. 10, 2011

(30) Foreign Application Priority Data
Jan. 15, 2009 (KR) .......................... 10-2009-0003367

(51) Int. Cl.
*B23B 27/16* (2006.01)
(52) U.S. Cl.
USPC .......................................... 407/105; 407/111
(58) Field of Classification Search
CPC ...................................................... B23B 27/16
USPC .......................................... 407/103–108, 111
See application file for complete search history.

(56) References Cited

U.S. PATENT DOCUMENTS

| 3,314,126 | A | * | 4/1967 | Stier | 407/105 |
| 3,491,421 | A | * | 1/1970 | Holloway | 407/105 |
| 3,815,195 | A | * | 6/1974 | McCreery | 407/105 |
| 3,908,255 | A | | 9/1975 | Faber | |
| 4,632,593 | A | * | 12/1986 | Stashko | 403/316 |

FOREIGN PATENT DOCUMENTS

| CN | 201105335 Y | 8/2008 |
| DE | 3414435 A1 | 10/1985 |
| JP | 07-015204 | 3/1995 |
| JP | 10-328910 | 12/1998 |

(Continued)

OTHER PUBLICATIONS

Official Action dated Sep. 25, 2012 issued in Chinese counterpart application (No. 200980154635.4) with English translation.

(Continued)

*Primary Examiner* — Daniel Howell
*Assistant Examiner* — Ryan Rufo
(74) *Attorney, Agent, or Firm* — Womble Carlyle

(57) ABSTRACT

A tool holder has an apparatus for clamping a cutting insert thereto. The tool holder has a cutting insert pocket and a mounting bore; a clamp lever including a clamp portion and a lever portion placed in the mounting bore; and a fixing screw. The fixing screw is fastened through a hole which extends downwardly from a side wall of the tool holder to the mounting bore. One end of the fixing screw further includes a pressure-applying surface substantially perpendicular to the rotational axis of the fixing screw, and the side surface of the lever portion of the clamp lever has an inclined surface which makes contact with the pressure-applying surface of the fixing screw. According to the clamping apparatus, the cutting insert can be firmly clamped to the tool holder.

14 Claims, 4 Drawing Sheets

(56) References Cited

FOREIGN PATENT DOCUMENTS

| | | | | |
|---|---|---|---|---|
| JP | 11-197910 | 7/1999 | | |
| JP | 11-347809 | 12/1999 | | |
| KR | 20-0390380 | 7/2005 | | |
| SU | 663492 A | * | 5/1979 | .............. B23B 27/16 |
| SU | 1756024 | * | 8/1992 | .............. B23B 27/16 |

OTHER PUBLICATIONS

International Search Report in PCT/KR2009/008016, dated Aug. 13, 2010.
Written Opinion in PCT/KR2009/008016, dated Aug. 13, 2010.

* cited by examiner

CLAMPING APPARATUS FOR A CUTTING INSERT

RELATED APPLICATIONS

This is a 35 USC 371 U.S. National Phase of International Application No. PCT/KR2008/008016, filed 31 Dec. 2009 and published in English as WO 2010/082736A1 on 22 Jul. 2010, which claims priority to KR 10-2009-0003367, filed 15 Jan. 2009. The contents of the aforementioned applications are incorporated by reference in their entirety.

TECHNICAL FIELD

The present invention relates to an apparatus for clamping a cutting insert to a tool holder.

BACKGROUND ART

FIG. 1 shows a conventional clamping apparatus for cutting insert, which employs an L-shaped clamp lever (7) and a fixing screw (5) for pressing the lever to fix a cutting insert (1) having a through-hole onto a pocket (9) of a tool holder (3).

FIGS. 2 and 3 show a clamping apparatus for a cutting insert disclosed in Japanese Patent No. 2,877,140. The L-shaped clamp lever (7) is placed in a mounting bore (10) of the tool holder (3). The cutting insert (1) is then mounted on a pocket (9) of the tool holder (3). A clamp portion (7a) of the clamp lever (7) is inserted through a through-hole (1a) of the cutting insert (1). A screw hole (8) is formed from the side surface of the tool holder (3) to the mounting bore (10). The fixing screw (5) is fastened through the screw hole (8) until an inclined surface (5a) of a conically-shaped end of the fixing screw (5) contacts a lever portion (7b) of the clamp lever (7). The fixing screw (5) exerts pressure on the clamp lever (7) as the inclined surface (5a) slides along the top surface of the lever portion (7b). The clamp (7) rotates clockwise about a support portion (7c). Further, the clamp portion (7a) presses the cutting insert (1) downward against the pocket (9) of the tool holder (3) as it contacts the inside wall of a through-hole (1a) of the cutting insert (1). This fixes the cutting insert (1) on the pocket (9) of the tool holder (3).

The clamping force, by which the clamp portion (7a) of the clamp lever (7) presses down the cutting insert (1) through the through-hole (1a), is generated when the fixing screw (5) presses down the lever portion (7b) of the clamp lever (7). Preferably, the fixing screw (5) would be inserted vertically to directly press down the lever portion (7b) of the clamp lever (7). However, in a machining tool such as a Swiss-style lathe that uses multiple tool holders together, the gap between the tool holders is small. As such, the fixing screw (5) should be inserted through the side of the tool holder due to space constraints.

However, similar to the clamp lever (7) disclosed in Japanese Patent No. 2,877,140, when an inclined surface of a conically-shaped end of the fixing screw (5) exerts pressure on the clamp lever (7) by sliding against the lever portion (7b) of the clamp lever (7), a considerable amount of the applied pressure of the fixing screw (5) is distributed to press the lever portion (7b) against the support portion (7c), which does not contribute to the clamping action of the cutting insert. As a result, the pressure by the fixing screw (5) is less distributed for pressing down the lever portion (7b), which contributes to the clamping action of the cutting insert, thereby preventing the cutting insert from being firmly clamped on the tool holder.

Further, a preferable surface-to-surface contact between the lever portion (7b) and the fixing screw (5) cannot be made in the conventional L-shaped clamp lever (7) since the lever portion (7b) and the fixing screw (5) make a line contact, or since the contact is made as the two curved surfaces move relative to each other. If a strong load is applied to the cutting insert (1), then sliding between the fixing screw (5) and the lever portion (7b) occurs at the contacted portion. Such sliding causes a displacement of the fixing screw (5) and the lever portion (7b) to prevent a stable clamping.

Moreover, sliding of the fixing screw (5) on the lever portion (7b) by rotating the fixing screw tends to wear out the contacted portion. If such sliding is repeated several times, then the contacted portion becomes severely worn out, which displaces the contacted portion between the fixing screw (5) and the lever portion (7b). The resulting displacement of the fixing screw (5) and the lever portion (7b) relative to each other in the clamping state leads to an unstable clamping state.

SUMMARY

The object of the present invention is to overcome the above shortcomings of the prior art by providing a clamping apparatus in which the pressure applied by the fixing screw is efficiently converted to the clamping force, sliding at the contacted portion between the fixing screw and the lever portion is prevented even when a great amount of load is applied to the cutting insert, and the fixing screw and the lever portion are prevented from being displaced relative to each other even if their contacted portions are worn out.

In order to achieve the above objects, the clamping apparatus according to a preferred embodiment of the present invention, comprises: a tool holder comprising a cutting insert pocket and a mounting bore exposed through a portion of the pocket; a clamp lever comprising a clamp portion inserted through a through-hole of the cutting insert and a lever portion placed in the mounting bore; and a fixing screw that exerts pressure on the lever portion of the clamp lever to secure the cutting insert on the tool holder. The fixing screw is fastened through a hole which extends downwardly from a side wall of the tool holder to the mounting bore. One end of the fixing screw further comprises a pressure-applying surface substantially perpendicular to the rotational axis of the fixing screw. Further, the side surface of the lever portion of the clamp lever comprises an inclined surface, which makes contact with the pressure-applying surface of the fixing screw.

The slope angle of the inclined surface of the lever portion ranges between 20° and 70°, preferably 50°.

According to an alternative embodiment of the present invention, screw holes for the fixing screw of the tool holder are provided on two opposite sides of the tool holder. Further, the lever portion of the clamp lever comprises two inclined surfaces on two opposite sides.

The clamping apparatus of the present invention further comprises a snap-ring provided between the inclined surface of the lever portion and the clamp portion. The snap-ring is capable of elastic deformation in the transverse direction. Also, the maximum width of the snap-ring, when the clamp lever is not inserted in the mounting bore, is larger than the distance between the side walls of the mounting bore.

According to the present invention, if a fixing screw is inserted through the side surface of the tool holder, then the pressure applied by the fixing screw can be efficiently converted to clamping force, thereby allowing the cutting insert to be firmly clamped on the tool holder.

Since a preferable surface-to-surface contact between the inclined surface of the lever portion and the pressure-applying surface of the fixing screw can be made, the resulting friction between the two surfaces keeps the cutting insert firmly clamped on the tool holder even when a great amount of load is applied to the cutting insert in a clamped state.

Further, even if one of the inclined surface of the lever portion and the pressure-applying surface of the fixing screw is worn out, the cutting insert can remain firmly clamped by further fastening the fixing screw.

DETAILED DESCRIPTION

The various embodiments of the present invention are described below in detail with reference to the accompanying drawings.

Figure 1:
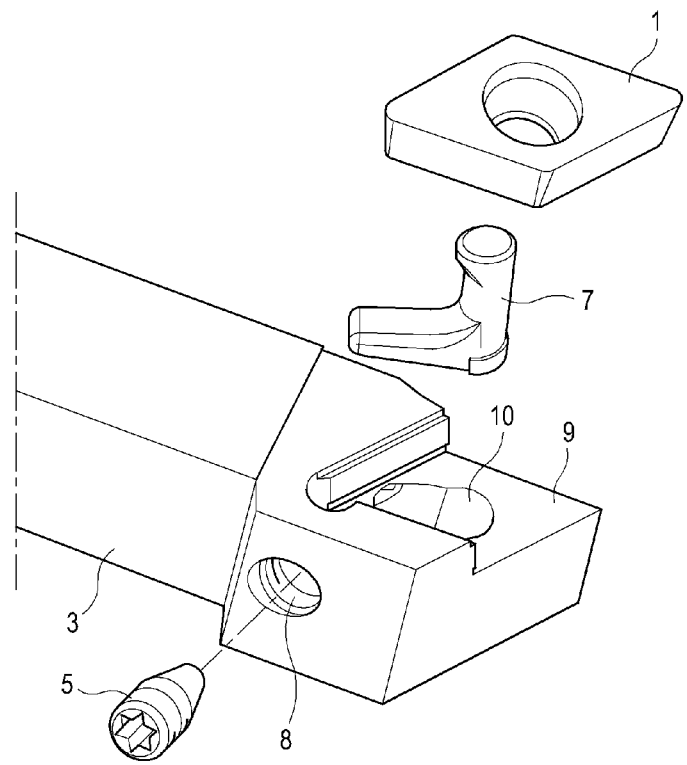
FIG. 1 is an exploded view of a conventional clamping apparatus for cutting insert.
Figure 2:
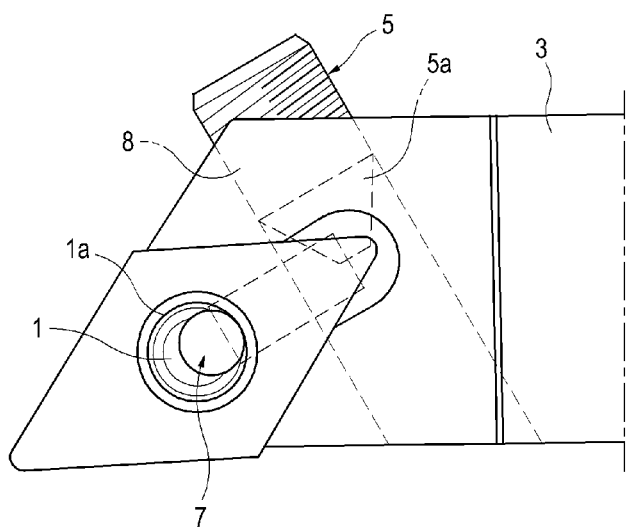
FIG. 2 is a plain view of a conventional clamping apparatus for cutting insert.
Figure 3:
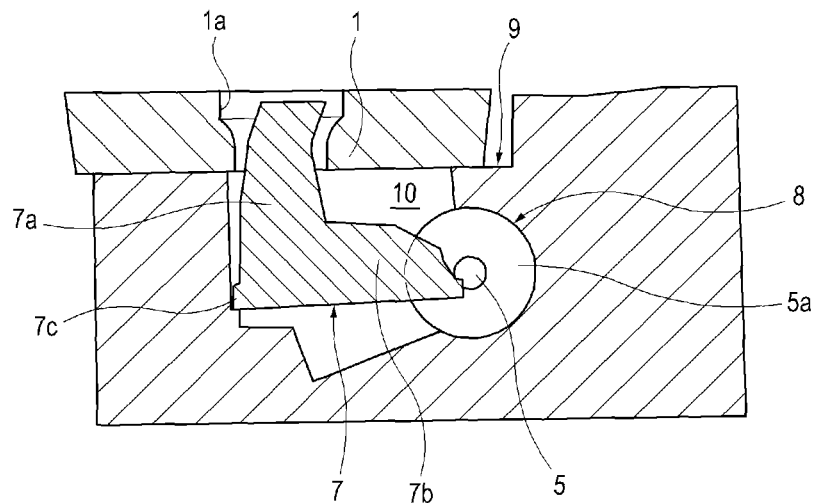
FIG. 3 is a fragmentary sectional view of a conventional clamping apparatus for cutting insert.
Figure 4:
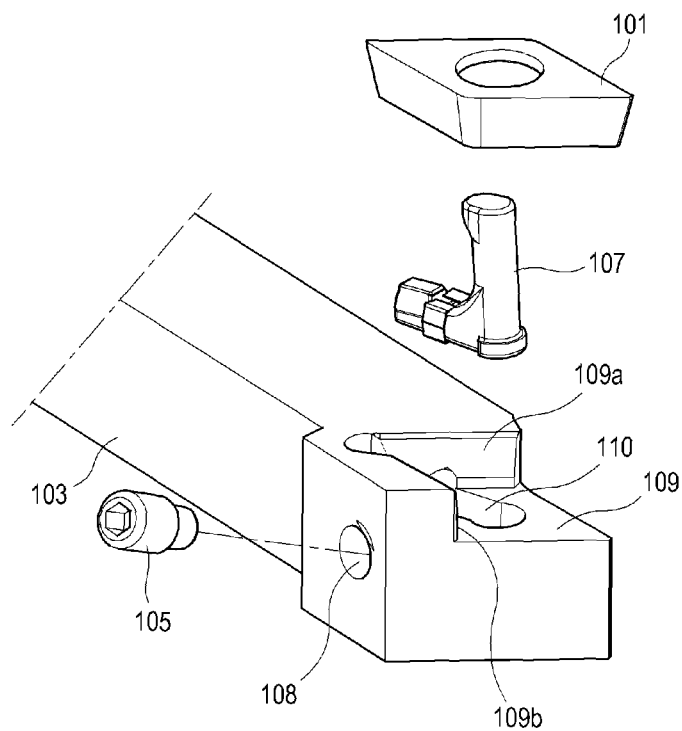
FIG. 4 is an exploded view of a clamping apparatus for cutting insert according to the first embodiment of the present invention.

FIG. 4 is an exploded view of a clamping apparatus for cutting insert according to the first embodiment of the present invention. The leading end of the tool holder (103) comprises a pocket (109) in which the cutting insert (101) is placed. The pocket (109) includes a first side surface (109a) disposed along the width direction of the tool holder (103) and a second side surface (109b) disposed along the longitudinal direction of the tool holder (103). The inside of the leading end of the tool holder (103) comprises a mounting bore (110) through which an L-shaped clamp lever (107) is inserted. Further, the mounting bore (110) is exposed through a portion of the pocket (109). The mounting bore (110) is communicated with a screw hole (108). The screw hole (108) for a fixing screw extends downwardly from a side surface of the tool holder to the mounting bore (110).

Figure 5:
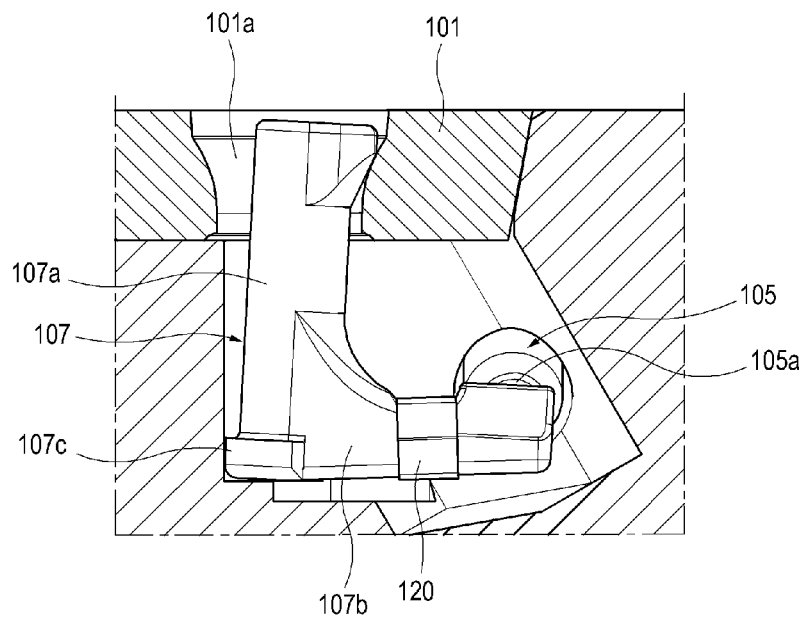
FIG. 5 is a fragmentary sectional view of a clamping apparatus for cutting insert according to the first embodiment of the present invention.
Figure 6:
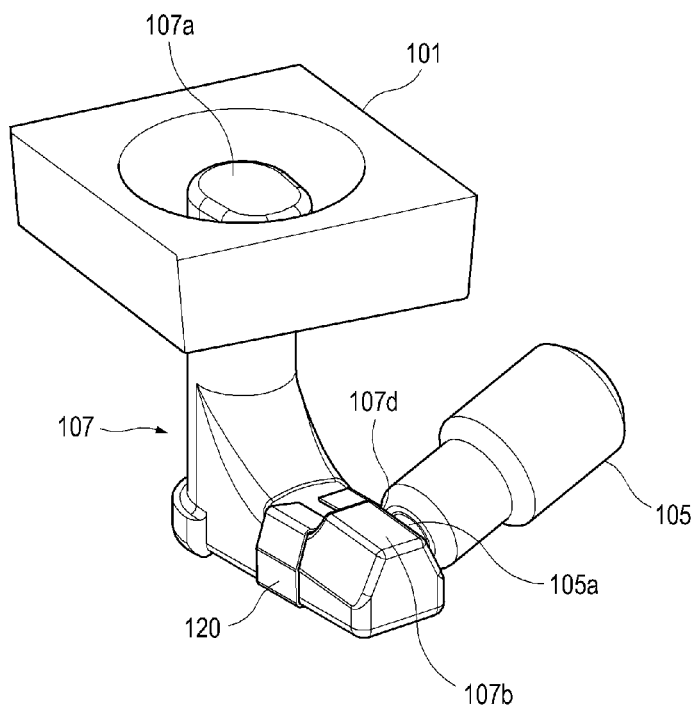
FIG. 6 is a perspective view of a clamping apparatus for cutting insert according to the first embodiment of the present invention.

FIGS. 5 and 6 illustrate a clamping apparatus for cutting insert according to the first embodiment of the present invention, wherein the cutting insert (101) is clamped by the fixing screw (105) which exerts pressure on the L-shaped clamp lever (107).

The end of the fixing screw (105), which contacts the L-shaped clamp lever (107), comprises a pressure-applying surface (105a) that is perpendicular to the rotational axis of the fixing screw (105). The screw hole (108) of the fixing screw extends downwardly from the side surface of the tool holder (103) to the mounting bore (110). The fixing screw (105), which is fastened therein, is also downwardly inclined and mounted thereon.

The L-shaped clamp lever (107) includes a vertically extending clamp portion (107a) and a longitudinally extending lever portion (107b). The end of the clamp portion (107a) is inserted through the through-hole of the cutting insert (101). The side surface of the lever portion (107a) is provided with an inclined surface (107d), which contacts the pressure-applying surface (105a) of the fixing screw (105).

As the fixing screw (105) pushes and pressures the inclined surface (107d) of the lever portion (107b) of the L-shaped clamp lever (107), the L-shaped clamp lever (107) rotates clockwise around the support portion (107c), whereby the end of the clamp portion (107a) applies pressure on the inside surface of the through-hole (101a) of the cutting insert. Accordingly, the cutting insert (101) is clamped to the pocket (109) of the tool holder (103).

Figure 7:
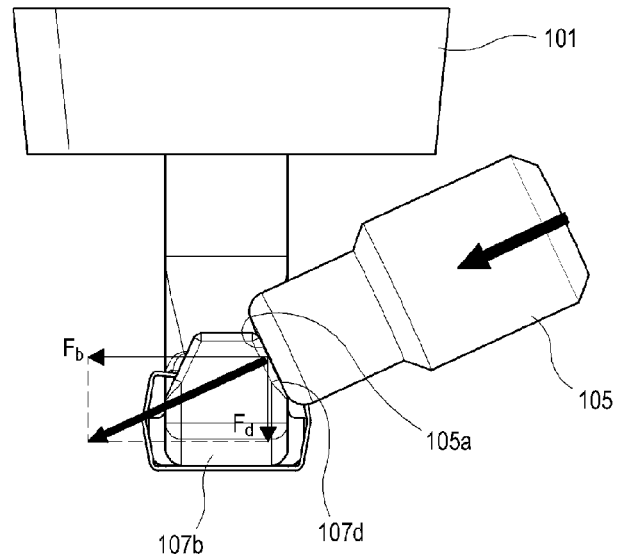
FIG. 7 illustrates a distribution of clamping force according to the first embodiment of the present invention.

A distribution of clamping force according to the first embodiment of the present invention is described below with reference to FIG. 7. The pressure-applying surface of the fixing screw (105) is perpendicular to the rotational axis of the fixing screw (105). When the L-shaped clamp lever (107) rotates and the end of the clamp portion (107a) comes into contact with the inside surface of the through-hole of the cutting insert (101), the inclined surface (107d) of the L-shaped clamp lever (107) is formed to be perpendicular to the rotational axis of the fixing screw (105). The inclined surface (107d) of the clamp lever (107) makes surface-to-surface contact with the pressure-applying surface (105a) of the fixing screw (105). The pressure generated by fastening the fixing screw (105) is transferred to the lever portion (107b) of the L-shaped clamp lever (107). Most of the pressure is distributed to the force (Fd) which pushes down the lever portion (107b) and to the force (Fb) which laterally pushes the lever portion (107b). As such, it is not distributed to the force to press the lever portion (107b) against the support portion (107c). The L-shaped clamp lever (107) rotates clockwise around the support portion (107c) by the force (Fd) of pushing the lever portion (107b) downward, and the clamp portion (107a) pushes the cutting insert (101) toward the pocket side surfaces (109a, 109b) of the tool holder (103). Meanwhile, the force (Fb) which pushes the lever portion (107b) in the lateral direction is inevitably generated since the fixing screw (105) is arranged to be tilted downward from the side surface. However, it is not actually used as a clamping force. The distribution rate between the force (Fd) pushing the lever portion (107b) downwardly and the force (Fb) pushing the lever portion (107b) laterally may be adjusted by changing the inclination angle of the inclined surface (107d) of the lever portion (107b) and the direction of the rotation axis of the fixing screw (105). Relative to the side surface of the lever portion (107b), the inclination angle of the inclined surface (107d) of the lever portion (107b) ranges from approximately 20° to 70°, preferably at approximately 50°.

Thus, according to the present invention, since the pressure of the fixing screw (105) is hardly converted into the force for pressing the lever portion (107b) of the L-shaped clamp lever (107) against the support portion (107c), the pressure is mostly distributed as the force to push the lever portion (107b) downwardly. This increases the rate of converting pressure of the fixing screw (105) into the clamping force.

Figure 8:
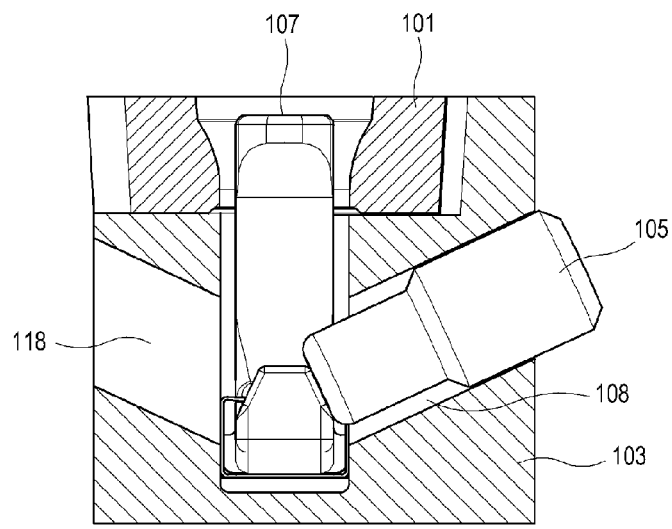
FIG. 8 is a fragmentary sectional view of a clamping apparatus for cutting insert according to the second embodiment of the present invention.

FIG. 8 illustrates a clamping apparatus for cutting insert according to the second embodiment of the present invention. The clamping apparatus for cutting insert according to the second embodiment of the present invention comprises screw holes (108, 118) for the fixing screws of the tool holder on both sides of the tool holder (103), and corresponding thereto, the inclined surfaces of the lever portion of the clamp lever (107) on both sides of the lever portion. Other features except for the above are all the same as those in the first embodiment. According to the second embodiment, if it is difficult for the fixing screw (105) to be fastened through the screw hole (108) on one side surface since the tool holder (103) is in a special working position, then the fixing screw (105) is fastened through the screw hole (118) formed on the opposite side surface and clamps the cutting insert (101). This enhances work efficiency and variety.

Figure 9:
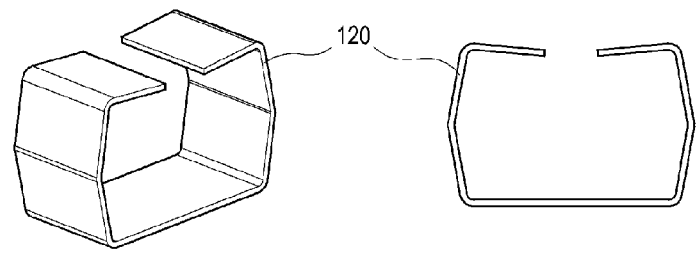
FIG. 9 illustrates a snap-ring according to the present invention.

FIG. 9 illustrates a snap-ring (120) to be mounted on the clamping apparatus for cutting insert according to the first and second embodiments of the present invention. The snap-ring (120) is formed by bending a spring steel plate, a portion of whose top is exposed. The snap-ring (120) is coupled between the clamp portion (107a) and the inclined surface (107d) of the lever portion (107b) of the clamp lever (107). The snap-ring (120) is elastically deformable in the width direction. The maximum width of the snap-ring (120) before it is mounted on the mounting bore (110) is greater than the distance between both side walls of the mounting bore (110). Thus, when the clamp lever (107) comprising the snap-ring (120) is inserted in the mounting bore (110), the snap-ring (120) is elastically deformed so that the width is reduced, and then makes contact with the side wall of the mounting bore (110). Then, the clamp lever (107) can be prevented from deviating from the mounting bore (110) due to the friction force generated between the snap-ring (120) and the side wall of the mounting bore (110).

The present invention has been explained based on the preferable embodiments. However, the explanation is only for examples, and a person skilled in the art would understand that various modifications may be possible from the examples within the scope of the present invention. For instance, the clamping apparatus for cutting insert according to one embodiment of the present invention does not actually distribute the fixing screw's pressure to the force for pressing the L-shaped clamp lever against the support portion of the L-shaped clamp lever. However, it is also possible to distribute only a portion of the fixing screw's pressure to the force for pressing the L-shaped clamp lever against the support portion of the L-shaped clamp lever by adjusting the direction of the inclined surface. Moreover, the location and shape of the side surfaces of the cutting insert pocket may vary depending on the shape of the cutting insert and the clamping location. Such variations are obvious to a person skilled in the art.

The invention claimed is:

1. A clamping apparatus for a cutting insert, comprising:
a tool holder comprising a cutting insert pocket and a mounting bore exposed through a portion of the pocket;
a clamp lever comprising a clamp portion inserted through a through-hole of the cutting insert and a lever portion placed in the mounting bore; and
a fixing screw exerting pressure on the lever portion of the clamp lever to secure the cutting insert on the tool holder, the fixing screw being fastened through a screw hole which extends downwardly from a side surface of the tool holder to the mounting bore,
wherein one end of the fixing screw is provided with a pressure-applying surface substantially perpendicular to the rotational axis of the fixing screw, and
wherein a side surface of the lever portion of the clamp lever is provided with an inclined surface which makes contact with the pressure-applying surface of the fixing screw.

2. The clamping apparatus of claim 1, wherein a slope angle of the inclined surface of the lever portion is between 20° and 70°.

3. The clamping apparatus of claim 2, wherein the slope angle of the inclined surface of the lever portion is 50°.

4. The clamping apparatus according to claim 1, wherein downwardly extending screw holes are provided on two opposite sides of the tool holder, the screw holes converging towards one another at a non-zero angle, and the lever portion of the clamp lever comprises two inclined surfaces on two opposite sides.

5. The clamping apparatus according claim 1, wherein:
the clamp lever comprises a snap-ring provided between the inclined surface of the lever portion and the clamp portion, the snap-ring being capable of elastic deformation in the transverse direction; and
the maximum width of the snap-ring, when the clamp lever is not inserted in the mounting bore, is larger than the distance between the side walls of the mounting bore.

6. The clamping apparatus according claim 1, wherein:
when the clamp portion of the clamp lever comes into contact with an inside surface of the cutting insert's through-hole to clamp the cutting insert, the inclined surface of the side surface of the lever portion is perpendicular to the rotational axis of the fixing screw, and makes surface-to-surface contact with the pressure-applying surface of the fixing screw.

7. The clamping apparatus according claim 1, wherein:
the pressure-applying surface of the fixing screw abuts the inclined surface of the clamp lever such that most of the pressure applied by the fixing screw to the lever portion pushes the lever portion downward.

8. A cutting tool comprising:
a tool holder comprising a cutting insert pocket and a mounting bore exposed through a portion of the pocket;
a cutting insert having a through-hole and secured in the cutting insert pocket by a clamp lever and a fixing screw, wherein:
the clamp lever comprises a clamp portion inserted through the through-hole of the cutting insert and a lever portion placed in the mounting bore;
the fixing screw exerts pressure on the lever portion of the clamp lever to secure the cutting insert on the tool holder, the fixing screw being fastened through a screw hole which extends downwardly from a side surface of the tool holder to the mounting bore,
one end of the fixing screw is provided with a pressure-applying surface substantially perpendicular to the rotational axis of the fixing screw, and
a side surface of the lever portion of the clamp lever is provided with an inclined surface which makes contact with the pressure-applying surface of the fixing screw.

9. The cutting tool of claim 8, wherein a slope angle of the inclined surface of the lever portion is between 20° and 70°.

10. The cutting tool of claim 9, wherein the slope angle of the inclined surface of the lever portion is 50°.

11. The cutting tool of claim 8, wherein downwardly extending screw holes are provided on two opposite sides of the tool holder, the screw holes converging towards one another at a non-zero angle, and the lever portion of the clamp lever comprises two inclined surfaces on two opposite sides.

12. The cutting tool of claim 8, wherein:
the clamp lever comprises a snap-ring provided between the inclined surface of the lever portion and the clamp portion, the snap-ring being capable of elastic deformation in the transverse direction; and the maximum width of the snap-ring, when the clamp lever is not inserted in the mounting bore, is larger than the distance between the side walls of the mounting bore.

13. The cutting tool according to claim 8, wherein:
when the clamp portion of the clamp lever comes into contact with an inside surface of the cutting insert's through-hole to clamp the cutting insert, the inclined surface of the side surface of the lever portion is perpendicular to the rotational axis of the fixing screw, and makes surface-to-surface contact with the pressure-applying surface of the fixing screw.

14. The cutting tool according to claim 8, wherein:
the pressure-applying surface of the fixing screw abuts the inclined surface of the clamp lever, such that most of the pressure applied by the fixing screw to the lever portion pushes the lever portion downward.

* * * * *